(12) United States Patent
Gindrat et al.

(10) Patent No.: US 8,871,010 B2
(45) Date of Patent: Oct. 28, 2014

(54) PLASMA SPRAY METHOD FOR THE MANUFACTURE OF AN ION CONDUCTIVE MEMBRANE

(76) Inventors: Malko Gindrat, Wohlen (CH); Rajiv J. Damani, Winterthur (CH)

( * ) Notice: Subject to any disclaimer, the term of this patent is extended or adjusted under 35 U.S.C. 154(b) by 103 days.

(21) Appl. No.: 13/421,696

(22) Filed: Mar. 15, 2012

(65) Prior Publication Data

US 2012/0240771 A1   Sep. 27, 2012

(30) Foreign Application Priority Data

Mar. 23, 2011   (EP) .................................... 11159374

(51) Int. Cl.
*B01D 53/22* (2006.01)
*B01D 67/00* (2006.01)
*B01D 69/12* (2006.01)
*B01D 71/02* (2006.01)
*C23C 4/12* (2006.01)
*C23C 4/04* (2006.01)
*C23C 4/10* (2006.01)

(52) U.S. Cl.
CPC ............ *C23C 4/105* (2013.01); *B01D 67/0039* (2013.01); *B01D 53/22* (2013.01); *C23C 4/127* (2013.01)
USPC .......... 96/11; 96/4; 95/54; 427/446; 427/453; 427/576

(58) Field of Classification Search
USPC ........... 96/4, 11; 95/45, 54, 55; 427/446, 453, 427/576
See application file for complete search history.

(56) References Cited

U.S. PATENT DOCUMENTS

| | | | | |
|---|---|---|---|---|
| 4,732,792 | A * | 3/1988 | Fujiyama ...................... | 427/453 |
| 5,356,674 | A * | 10/1994 | Henne et al. .................. | 427/576 |
| 6,440,278 | B1 * | 8/2002 | Kida et al. .................... | 427/453 |
| 7,494,723 | B2 * | 2/2009 | Harada et al. ................. | 427/453 |
| 7,713,635 | B2 * | 5/2010 | Goto et al. .................... | 427/453 |
| 2007/0259173 | A1 * | 11/2007 | Refke et al. ................... | 427/569 |
| 2009/0136695 | A1 * | 5/2009 | Damani et al. ................ | 427/446 |

FOREIGN PATENT DOCUMENTS

| EP | 1 338 671 A1 * | 8/2003 | ............... C23C 4/12 |
|---|---|---|---|
| EP | 1 479 788 A1 | 11/2004 | |
| EP | 1 852 519 A1 | 11/2007 | |
| EP | 2 025 772 A1 | 2/2009 | |
| EP | 2 030 669 A1 | 3/2009 | |

* cited by examiner

*Primary Examiner* — Jason M Greene
(74) *Attorney, Agent, or Firm* — Greenblum & Bernstein, P.L.C.

(57) ABSTRACT

A plasma spray method for the manufacture of an ion conductive membrane is provided which ion conductive membrane has an ion conductivity, in which method the membrane is deposited as a layer (11) onto a substrate (10) in a process chamber, wherein a starting material (P) is sprayed onto a surface of the substrate (10) in the form of a process beam (2) by means of a process gas (G), wherein the starting material is injected into a plasma at a low process pressure, which is at most 10,000 Pa, and is partially or completely molten there. Oxygen ($O_2$; 22) is supplied to the process chamber (12) during the spraying at a flow rate which amounts to at least 1%, preferably at least 2%, of the overall flow rate of the process gas.

20 Claims, 1 Drawing Sheet

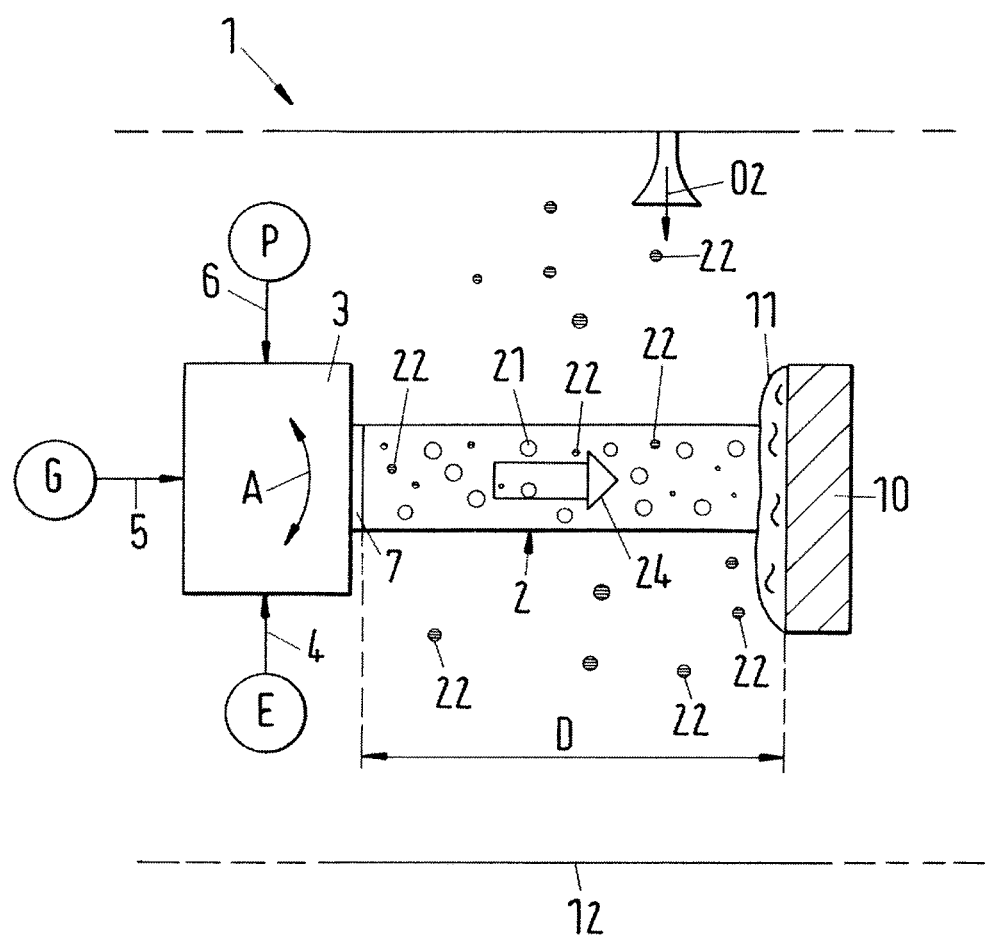

PLASMA SPRAY METHOD FOR THE MANUFACTURE OF AN ION CONDUCTIVE MEMBRANE

CROSS-REFERENCE TO RELATED APPLICATIONS

This application claims the priority of European Application No. 11 159 374.5, filed on Mar. 23, 2011, the disclosure of which is incorporated herein by reference.

The invention relates to a plasma spray method for the manufacture of an ion conductive membrane in accordance with the preamble of the independent patent claim.

Ion conductive membranes are membranes which have a high selective permeability for specific ions, such as, for example, oxygen-permeable membrane layers which have a high selective permeability for oxygen and are substantially impermeable for other gases. Correspondingly such membranes are used in order to extract or to purify oxygen from gas mixtures or fluid mixtures.

Such membranes can be manufactured from the most diverse materials, for example, they can be composed of complex oxide materials which have a specific chemical composition and which form specific phases. In particular ceramic membranes are known which are composed of oxides of the perovskite type and which are manufactured in the form of thin, dense—this means not porous—layers. Such membranes, for example, have both an ion conductivity for oxygen and also an electron conductivity.

A material which is investigated and used today for the manufacture, in particular of oxygen-permeable membranes, is a ceramic which has a perovskite structure and includes the elements lanthanum (La), strontium (Sr), cobalt (Co) and iron (Fe) beside oxygen. According to the first letters of these four elements the substance is typically referred to as LSCF.

Oxygen-permeable membranes or generally ion conductive membranes made of such materials can be manufactured, for example, by means of conventional manufacturing techniques for ceramics, such as for example pressing, tape casting, slip casting or sintering, or also by means of thermal spraying. For the latter, in particular thermal spray processes are suitable which are carried out in vacuum, this generally means that the spray process is carried out at a process pressure which is smaller than the environmental pressure (normal air pressure).

In particular a thermal low pressure plasma spray method or a vacuum plasma spray method, which is referred to as an LPPS method (Low Pressure Plasma Spraying) is suitable. By means of this vacuum plasma spray method particularly thin and dense layers can namely be sprayed, i.e. such which are required also for ion conductive membranes or oxygen-permeable membranes.

In practice it has now been shown that on vacuum plasma spraying of such membranes the chemical composition of the layer manufactured by way of spraying no longer corresponds to the chemical composition of the starting material, so that also the generated layer no longer has the desired chemical composition, or that the phase composition of the layer no longer is the same as that of the starting material. Thus, for example, it can be seen for perovskite substances that the desired phase—in this case thus the perovskite phase—is no longer formed or is only formed to a lesser degree. Specifically, the condensation of metallic elements, such as for example, iron or cobalt, at the walls of the process chamber can be monitored.

For this reason it is an object of the invention to solve this problem and to provide a plasma spray method in which an ion conducting and specifically oxygen-permeable membrane of an improved quality can be manufactured.

The subject matter of the invention solving this object is characterized by the independent method claim.

In accordance with the invention, thus a plasma spray method for the manufacture of an ion conductive membrane is provided, which has an ion conductivity, in which method the membrane is deposited as a layer onto a substrate, wherein a starting material is sprayed onto a surface of the substrate in the form of a process beam by means of a process gas, wherein the starting material is injected into a plasma at a low process pressure, which is at most 10,000 Pa and is partially or completely molten there. Oxygen is supplied to the process chamber during the spraying at a flow rate which amounts to at least 1%, preferably at least 2%, the overall flow rate of the process gas.

Preferably, an inert atmosphere or an atmosphere with reduced oxygen content is present during the spraying in the process chamber.

It has been shown that one can counter-act the undesired chemical changes of the starting material during the thermal spraying by the measure of supplying of oxygen, whereby both the chemical composition of the layer generated by way of spraying and also its phase, corresponds to the desired composition. Through the supply of oxygen during the thermal spraying it is efficiently avoided that the formation of an atmosphere with reducing properties arises on thermal spraying in the process chamber.

Thereby it is, for example, avoided that metal oxides contained in the starting material are reduced and are deposited in the form of elemental methods or in the form of combinations thereof at the walls of the process chamber. In particular the deposition of a metallic cobalt or of iron and their combination can be avoided or at least significantly reduced on spraying of an LSCF powder, so that ion conducting and particularly oxygen-permeable membranes of improved quality can be manufactured.

Preferably, the membrane also has an electron conductivity beside its ion conductivity.

Preferably, the plasma spray process is carried out such that the plasma defocuses and accelerates the process beam. By means of this method particularly thin and dense layers can be advantageously made.

In practice it has been found to be advantageous when the process pressure in the process chamber is set to a value of at least 50 Pa and to at most 2000 Pa.

Particularly preferably, the method is carried out such that the starting material is a powder whose chemical composition is substantially the same as the chemical composition of the layer, this means that a powder is used as a starting material which substantially has the same chemical composition which the sprayed layer should also have.

Furthermore, it is preferred to carry out the method such that the starting material is a powder whose phase composition is substantially the same as that of the phase composition of the layer.

In a preferred embodiment the layer forming the membrane is composed of a ceramic material which is an oxide of the perovskite type.

In view of the oxygen permeability it has been particularly proven when the layer is made of a perovskite which includes lanthanum (La), strontium (Sr), cobalt (Co) and iron (Fe). It is naturally understood that the term "composed of" in this connection means that the substantial part of the layer is present in the form of a perovskite phase. Naturally it is also possible that also other phases are present in this layer to a smaller degree.

In practice it has been proven when the overall flow rate of the process gas is less than 200 SLPM on plasma spraying and, in particular amounts to 100 to 160 SLPM (SLPM: standard liter per minute).

In a first preferred embodiment of the method, the process gas is a mixture of argon and helium.

In a second preferred embodiment of the method, the process gas is composed of argon, helium and hydrogen.

Preferably, the plasma spray method is carried out such that the layer generated on the substrate has a thickness less than 150 Micrometer and preferably of 20 to 60 Micrometers. This layer thickness has proven itself for the oxygen-permeable membrane.

It has also been found advantageous when the process beam is pivoted or is scanned relative to the surface of the substrate. This can, for example, take place by pivoting the plasma generator and/or the plasma source and/or the exit nozzle. The process beam is thus guided relative to the substrate so that the substrate is scanned, i.e. is covered one or more times by the process beam. Alternatively or in addition hereto it is naturally also possible to move the substrate. There are naturally many possibilities of realizing this relative movement between the process beam and the substrate. This pivot movement and/or the scanning of the substrates causes that the oxygen introduced into the process chamber comes into contact as much as possible with the process beam or with the layer building up on the substrate.

The method is particularly suitable also for the case of application in which the ion conductive membrane is an oxygen-permeable membrane which has an ion conductivity for oxygen.

By means of the invention, an ion conductive membrane is further provided, in particular an oxygen-permeable membrane which is manufactured in accordance with the method according to the invention.

Further advantageous measures and preferred embodiments of the invention results from the dependent claims.

In the following, the invention will be explained in detail by way of embodiments and with reference to the drawings. In the schematic drawing shown partially in section, there is shown:

FIG. 1 a schematic illustration of an apparatus for carrying out a method in accordance with the invention.

The plasma spray method in accordance with the invention for manufacturing an ion conductive membrane will be explained in the following with reference to a case of application particularly relevant for practice in which the membrane is a membrane which is selectively permeable for oxygen, which thus has an ion conductivity for oxygen. Preferably, the membrane also has an electron conductivity. The method is a thermal spray method which is carried out in vacuum, i.e. at a process pressure which is smaller than this environmental pressure.

FIG. 1 shows a plasma spray apparatus in a very schematic illustration which is referred to overall using the reference numeral 1 and which is suitable for carrying out a method in accordance with the invention. Moreover, a substrate 10 is schematically illustrated in FIG. 1 onto which an oxygen-permeable membrane is deposited in the form of a layer 11. Furthermore, a process chamber 12 is indicated in which the method is carried out.

The method in accordance with the invention includes a plasma spray method, the kind of which is described in WO-A-03/087422 or also in U.S. Pat. No. 5,853,815. This plasma spray method is a thermal spray method for the manufacture of a so-called LPPS-thin film (LPPS=Low Pressure Plasma Spraying).

Specifically, an LPPS-based method is carried out in the plasma spray apparatus 1 illustrated in FIG. 1. In this a conventional LPPS plasma spray method is modified in view of the process technology, wherein a space flooded by plasma ("plasma flame" or "plasma beam") is expanded and extended to a length of up to 2.5 m due to the changes. The geometric extent of the plasma leads to a uniform expansion—a "defocusing"—and to an acceleration of a process beam which is injected into the plasma with a feed gas. The material of the process beam which is dispersed to a cloud in the plasma and is partially or completely molten there arrives uniformly distributed at the surface of the substrate 10.

The plasma spray apparatus 1 illustrated in FIG. 1 includes a plasma generator 3 known per se having a non-closer illustrated plasma burner for the generation of a plasma. In a manner known per se, a process beam 2 is generated with the plasma generator 3 from a starting material P, a process gas and/or a process gas mixture G and electrical energy E. The injection of these components E, G and P is symbolized by the arrows 4, 5, 6 in FIG. 1. The generated process beam 2 exits through an exit nozzle 7 and transports the starting material P in the form of the process beam 2 in which the material particles 21 are dispersed in the plasma. This transport is symbolized by the arrows 24. The material particles 21 are generally powder particles. The morphology of the layer 11 deposited on the substrate 10 is dependent on the process parameters and, in particular on the starting material P, the process enthalpy and the temperature of the substrate 10. Preferably, the plasma generator 3 and/or the plasma torch is pivotable with regard to the substrate 10 as is indicated by the double arrow A in FIG. 1. Therefore the process beam 2 can be moved to and fro in a pivot movement over the substrate 10.

In the LPPS process described in this context, the starting material P is injected into a plasma defocusing the material beam and is partially or completely molten or at least made plastic there at a low process pressure of at most 10,000 Pa and preferably of at least 50 Pa and at most 2000 Pa. For this purpose a plasma having a sufficiently high specific enthalpy is generated, so that a very dense and thin layer 11 emerges at the substrate. The variation of the structure is substantially influenced and controllable through the coating conditions, in particular of process enthalpy, work pressure in the coating chamber as well as the process beam. Therefore the process beam 2 has properties which are determined by the controllable process parameters.

For the manufacture of the oxygen-permeable membrane the layer 11 is generated such that it has a very dense microstructure.

Initially the method step of generating the layer 11 by means of LPPS will now be explained in detail.

A powder of suitable composition is selected as starting material P as will be explained later on in detail. As was already mentioned the plasma flame is very long in the LPPS process in comparison to conventional plasma spray methods due to the set process parameters. Furthermore, the plasma flame is strongly expanded. A plasma with a high specific enthalpy is generated, whereby a high plasma temperature results. Due to the high enthalpy and the length and/or the size of the plasma flame, a very high influx of energy into the material particles 21 is brought about which are thereby, on the one hand, strongly accelerated and, on the other hand, are brought to a very high temperature, so that they are very well melted and are also still very hot after their deposition on the substrate 10. Since, on the other hand, the plasma flame and therefore the process beam 2 is very strongly expanded, the local heat flow into the substrate 10 is small, so that a thermal damage of the material is avoided. The expanded plasma flame further has the effect that, typically on the one time covering of the substrate 10 with the process beam 2, the material particles 21 are deposited in the form of individual splats which do not manufacture a continuous, this means connected layer. Thereby, very thin layers 11 are manufacturable. The high kinetic and thermal energy which the material particles obtain during their long stay in the plasma flame in comparison to conventional plasma spray methods promote the formation of a very dense layer 11 which, in particular has very few boundary surface hollow spaces between splats lying on top of one another.

The plasma is, for example, generated in the plasma torch in the plasma generator 3 generally known per se with an electric direct current and by means of a pin cathode, as well as a ring-like anode. The power consumption of the plasma torch lies in the region of up to 180 kW. The power supplied to the plasma, the effective power can be empirically determined with regard to the resulting layer structure. The effective power which results through the difference between the electric power and the heat led away by cooling from experience lies in the region, for example, of 40 to 130 kW, in particular of 80 to 100 kW. In this connection it has been proven that if the electric current for the plasma generation lies between 1000 and 3000 A, in particular between 1500 and 2600 A.

A value of between 10 and 10,000 Pa is selected for the process pressure of the LPPS-TF plasma spraying for the generation of the oxygen-permeable membrane in the process chamber 12, preferably between 50 and 2000 Pa.

The starting material P is injected into the plasma as a powder jet.

The process gas for the generation of the plasmas is preferably a mixture of inert gases, in particular a mixture of argon Ar, of helium He and possibly of hydrogen H. In practice the following gas flow rates have been particularly proven for the process gas:

Ar-flow rate: 30 to 150 SLPM, in particular 50 to 100 SLPM;

$H_2$-flow rate: zero to 20 SLPM, in particular 2 to 10 SLPM;

He-flow rate: zero to 150 SLPM, in particular 20 to 100 SLPM;

wherein the overall flow rate of the process gas is preferably smaller than 200 SLPM and in particular amounts to 100 to 160 SLMP.

In accordance with the invention oxygen is supplied to the process chamber 12 during the thermal spraying such as it is indicated by the arrow referred to with the reference numeral O2 and the oxygen particles 22. In this respect the oxygen particles 22 are brought into contact with the process beam 2 and/or with the substrate 10 and/or with the layer 11 being built up thereon. The oxygen is supplied to the process chamber at a flow rate which amounts to at least 1%, preferably to at least 2% of the overall flow rate of the process gas. The oxygen particles 22 mix with the process beam 2 and are also present in the vicinity of the substrate 10 and/or of the layer being built up thereon. Thereby it is ensured that the different components of the starting material P are mixed through with the oxygen particles 22 during their transport in the process beam 2 and/or after their deposition on the substrate 10 are present in their vicinity. The oxygen particles 22 prevent the build up of a reducing atmosphere, which could, for example, reduce metal oxides to elemental methods or other reduction products and connections of the starting oxides in the process beam 2 or at the surface of the substrate 10. Therefore the supplied oxygen efficiently prevents the undesired reduction of components of the starting material P. In order to enable an as good as possible contact between the process beam and/or the layer 11 building up itself, on the one hand, and the oxygen particles 22 it is advantageous to pivot the plasma generator 3 and/or the plasma torch with regard to the surface of the substrate 10 to be coated.

It can be advantageous when the substrate—additionally or alternatively—is moved during the material deposition by means of rotary movements or pivot movements relative to this cloud.

In the following, reference is made to the example particularly relevant for practice in which the oxygen-permeable membrane is composed of a ceramic, which includes the elements lanthanum (La), strontium (Sr), cobalt (Co) and iron (Fe) beside oxygen. Such ceramics are referred to as LSCF. In this respect it is desired that the membrane is almost completely made up of a perovskite structure. However, it is naturally understood that the invention is not limited to such substances, but is, in particular also suitable for other ceramic materials, specifically oxides of the perovskite type.

As already mentioned, the starting material P is provided in the form of a powder. The plasma spray method is then carried out so that the chemical composition of the layer is substantially the same as the chemical composition of the starting material.

LSCF as a ceramic material belongs to the oxides of the perovskite type, which substantially have the form $ABO_3$. In this respect A stands for $La_xSr_{1-x}$ and B for $Co_yFe_{1-y}$. However, it should be noted that the stoichiometry does not have to be exactly satisfied. It is rather possible that the La content and the Sr content and/or the Co content and the Fe content do not have to match exactly to one. Also the oxygen content can deviate from the precise stoichiometry. For this reason, it is typical to state the oxygen content as 3-σ, wherein σ is the deviation of the oxygen content from the stoichiometric equilibrium. The minus signs indicates that this deviation generally is a deficiency of oxygen, this means that the oxygen is present under stoichiometrically.

In the example described here, LACF is present in the form $La_{0.58}Sr_{0.4}Co_{0.2}Fe_{0.8}O_{3-\sigma}$. The starting material P is present as powder. For the manufacture of the powder particles different methods can be used, for example, spray drying or a combination of melting and subsequent braking and/or milling of the solidified melt.

The manufacture of such powders is generally known and does not require a detailed explanation here. In view of the plasma spraying it is preferred, when the powder seeds have a size of, for example, from 25±5 μm.

The value σ for the deviation of the oxygen content in the stoichiometry is, for example, 0.3.

For the two examples described in the following $La_{0.58}Sr_{0.4}Co_{0.2}Fe_{0.8}O_{3-\sigma}$ is respectively used as a starting material. The process pressure in the pressure chamber 12 is set to a value between 50 and 2000 Pa. By means of a plasma torch, which can generate a plasma of high specific enthalpy of up to 10,000 to 15,000 kJ/kg and which can take up a power of up to 180 kW, a plasma beam and/or a process beam 2 of high enthalpy is generated. The process beam 2 has a length of 1000 to 2000 mm and a diameter of up to 200-400 mm. The length of the process beam 2 substantially corresponds to the spray distance, this means to the distance D between the exit nozzle 7 and the substrate 10. A porous plate of a high temperature nickel-based alloy serves, for example, as a substrate or a substrate of a fire-resistant ceramic.

The starting material P is introduced by means of two powder supplies, wherein the feed rate is up to 120 g/min, typically 40 g/min. By means of a pivot movement of the plasma torch a very thin and dense layer 11 is applied onto the substrate 10, wherein the high energy input into the material particles 21 and the high (ultrasonic) speed in the process beam 2 enables a very dense build up of the layer 11. The layer 11 is sprayed until it finally has a layer of 20-60 μm. The coating time amounts to approximately one minute. During the thermal spraying, the process chamber 12 is supplied with oxygen and indeed at a flow rate of at least 1%, preferably with at least 2% of the overall flow rate of the process gas. Hereby, the reduction and the degradation of the starting material P and/or its components is avoided or is at least strongly reduced. In particular the precipitation and/or the deposition of elementary Co or Fe or of their combinations is avoided or at least strongly reduced. From this, it results that the chemical and phase-compositions of the layer 11 are substantially the same as that of the starting material P.

EXAMPLE 1

The process is carried out as described above. A mixture of argon and helium is used as a process gas, wherein the argon flow rate amounts to 80 SLPM and the He flow rate amounts to 40 SLPM, so that the overall flow rate of the process gas amounts to 120 SLPM. The current for the generation of the plasma amounts to 2600 A.

EXAMPLE 2

The process is carried out as described above. A mixture of argon, helium and hydrogen is used as a process gas, wherein the Ar flow rate amounts to 80 SLPM, the He flow rate amounts to 20 SLPM and the $H_2$ flow rate amounts to 6 SLPM, so that the overall flow rate of the process gas amounts to 106 SLPM. The current for the generation of the plasma amounts to 2600 A.

In both cases oxygen-permeable membranes result whose chemical composition and perovskite phase structure is substantially the same as that of the starting material.

The invention claimed is:

1. A method of manufacturing an ion conductive membrane having an ion conductivity, the method comprising:
    arranging a substrate in a process chamber;
    plasma spraying a starting material via a process beam that includes a process gas, wherein during the plasma spraying the starting material is injected into a plasma at a process pressure which is at most 10,000 Pa, and is partially or completely molten there;
    forming a layer on a surface of the substrate in the process chamber by depositing the plasma sprayed starting material; and
    supplying oxygen to the process chamber during the plasma spraying,
    wherein the oxygen is supplied at a flow rate which amounts to at least 1% of an overall flow rate of the process gas and from a location outside the process beam.

2. The method of claim 1, wherein the flow rate is at least 2% of an overall flow rate of the process gas.

3. The method of claim 1, wherein the plasma defocuses and accelerates the process beam.

4. The method of claim 1, wherein the process pressure is between at least 50 Pa and at most 2000 Pa.

5. The method of claim 1, wherein the starting material is a powder.

6. The method of claim 1, wherein a chemical composition of the starting material is substantially the same as a chemical composition of the layer.

7. The method of claim 1, wherein a phase composition of the starting material is substantially the same as a phase composition of the layer.

8. The method of claim 1, wherein the layer is composed of a ceramic material which is an oxide of the perovskite type.

9. The method of claim 1, wherein the layer is composed of a perovskite which includes lanthanum (La), strontium (Sr), cobalt (Co) and iron (Fe).

10. The method of claim 1, wherein the process gas has an overall flow rate that is less than 200 SLPM.

11. The method of claim 10, wherein the overall flow rate is between 100 SLPM and 160 SLPM.

12. The method of claim 1, wherein the process gas is a mixture of argon and helium.

13. The method of claim 1, wherein the process gas is composed of argon, helium and hydrogen.

14. The method of claim 1, wherein the layer has a thickness of less than 150 micrometers.

15. The method of claim 14, wherein the thickness is between 20 micrometers and 60 micrometers.

16. The method of claim 1, further comprising subjecting the process beam to swiveling or scanning relative to the surface of the substrate.

17. The method of claim 1, wherein the ion conductive membrane is an oxygen permeable membrane that has an ion conductivity for oxygen.

18. A method of manufacturing an ion conductive membrane having an ion conductivity, the method comprising:
    arranging a substrate in a process chamber;
    plasma spraying a powder starting material via a process beam that includes a process gas, wherein during the plasma spraying the starting material is injected into a plasma at a process pressure which is at most 10,000 Pa, and is partially or completely molten there;
    forming a layer on a surface of the substrate in the process chamber by depositing the plasma sprayed starting material; and
    supplying oxygen to the process chamber from a location outside the process beam, at a flow rate which amounts to at least 1% of an overall flow rate of the process gas, and so that the oxygen mixes with the process beam and is present in a vicinity of the substrate,
    wherein a chemical composition of the starting material is substantially the same as a chemical composition of the layer.

19. A method of manufacturing an ion conductive oxygen permeable membrane, the method comprising:
    arranging a substrate in a process chamber;
    plasma spraying a starting material via a process beam that includes a process gas, wherein during the plasma spraying the starting material is injected into a plasma at a process pressure which is at most 10,000 Pa, and is partially or completely molten there;
    forming a layer on a surface of the substrate in the process chamber by depositing the plasma sprayed starting material; and
    supplying oxygen to the process chamber during the plasma spraying at a flow rate which amounts to at least 1% of an overall flow rate of the process gas and from a location outside the process beam, whereby the oxygen mixes with the process beam and is present in a vicinity of the substrate,
    wherein a chemical composition and a perovskite phase structure of the starting material is substantially the same as a chemical composition and a perovskite phase structure of the layer.

20. The method of claim 19, wherein the starting material is a powder.

\* \* \* \* \*